Feb. 3, 1925.

O. T. BLÁTHY 1,525,022

SPEED REGULATION OF POLYPHASE INDUCTION MOTORS

Filed Dec. 19, 1921     3 Sheets-Sheet 1

Inventor:
Otto Titusz Bláthy.
by Emery, Booth, Janney Varney
Attys.

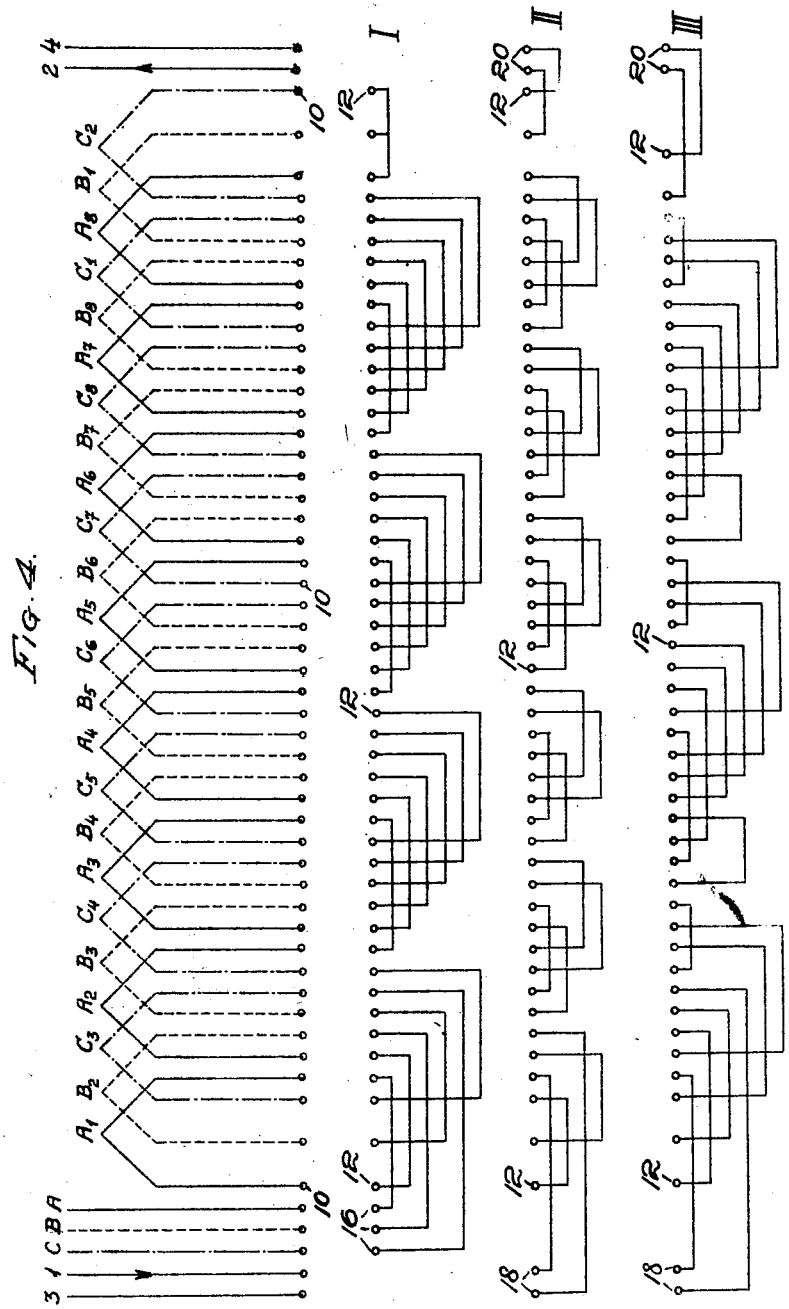

Patented Feb. 3, 1925.

1,525,022

UNITED STATES PATENT OFFICE.

OTTO TITUSZ BLÁTHY, OF BUDAPEST, HUNGARY.

SPEED REGULATION OF POLYPHASE INDUCTION MOTORS.

Application filed December 19, 1921. Serial No. 523,526.

*To all whom it may concern:*

Be it known that I, OTTO TITUSZ BLÁTHY, a citizen of Hungary, residing at Budapest, in Hungary, have invented certain new and useful Improvements in the Speed Regulation of Polyphase Induction Motors, of which the following is a specification.

Arrangements for the speed regulation of polyphase induction motors are known in which for the purpose of employing the total number of the coils for the different speed ratios the change is effected from an $n \times 8$ pole three-phase winding with coils arranged in two planes (that is a three-phase winding having a coil in each phase for each two poles) into an $n \times 6$ pole two-phase winding, whereby two speeds can be produced in the ratio of three to four.

The ratio of three to four is, however, too small for certain purposes and particularly for railway work.

The present invention relates to a system of pole-changing for polyphase induction motors for the production of two speeds in the ratio of two to three similarly employing the total number of the coils in both pole arrangements and by changing the three-phase winding into a two-phase winding.

According to the new method, a three-phase winding serves as a basis for the introduction of the change mentioned, a coil, or a group of turns, being provided in each phase for each pole and each coil overlapping two coils in each of two other phases.

The pole change is effected according to this invention on changing from a three-phase winding to a two-phase winding, in such a manner that in each phase of the three-phase winding the consecutive coils are arranged alternately in the one or the other phase of the two-phase arrangement in such a manner that in the two-phase arrangement each coil overlaps the two neighboring coils arranged in the same phase by the breadth of a coil-side.

In the drawings:—

Fig. 4 shows diagrammatically a motor wound according to Figs. 1, 2 and 3 with associated sources of three and two-phase current and a controller for securing an 8 pole three-phase motor or a 12 pole two-phase motor or a 6 pole two-phase motor.

Figure 1:
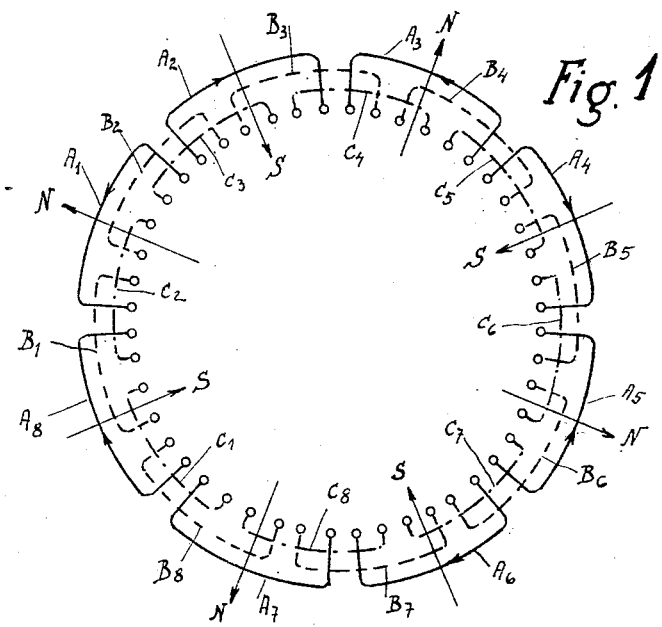
Fig. 1 shows diagrammatically a winding of an induction motor arranged for three-phase operation.

Figure 1 of the accompanying drawings illustrates diagrammatically by way of example a $2 \times 4$ pole, that is an 8 pole three-phase winding. It is necessary in carrying out the new arrangement that the winding shall contain in each phase of the three-phase winding, one coil per pole, that is in all $n \times 4 \times 3$ or $n \times 12$ coils, each coil overlapping two coils of each of the other two phases. The coils belonging to the three different phases are shown with different types of lines and the poles produced by the phase shown in full lines are indicated.

Figure 2:
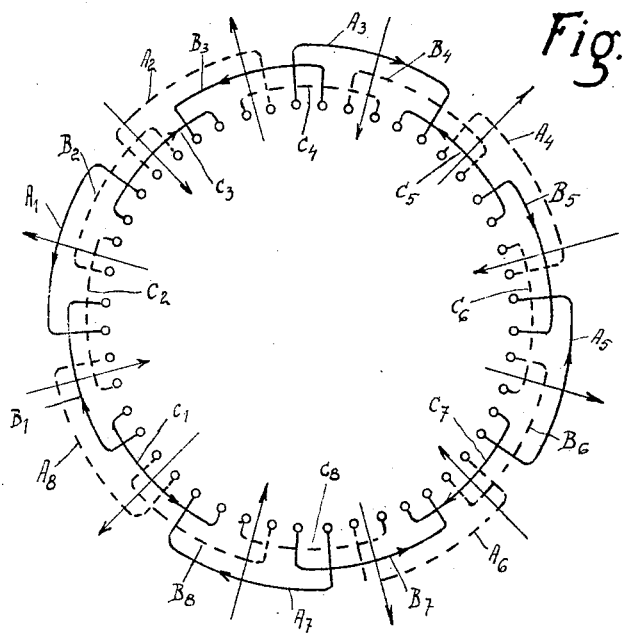
Fig. 2 shows the same winding as Fig. 1 arranged for 12 pole two-phase operation.
Figure 3:
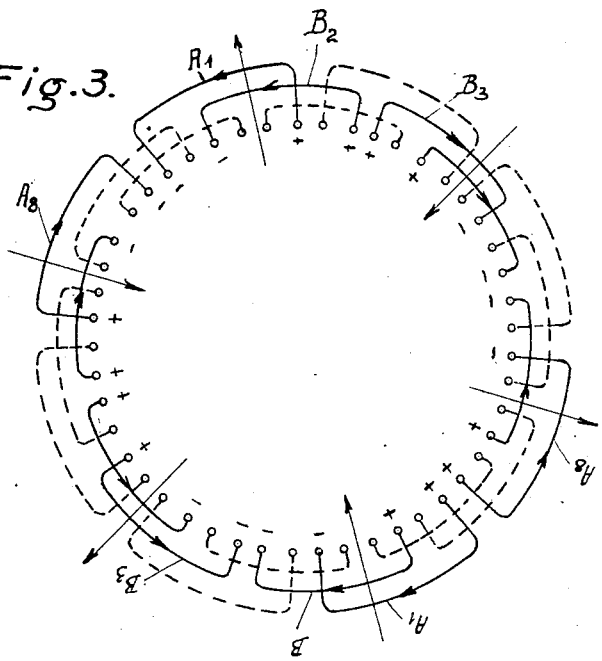
Fig. 3 shows the winding according to Fig. 1 arranged for 6 pole two-phase operation.

The speed of the motor is changed by changing the connections of the coils and energizing them from a three-phase or two-phase current source. Figs. 1, 2 and 3 show the same winding, Fig. 1 indicating the motor when energized from a three-phase current source and the coils connected to give 8 poles, while Figs. 2 and 3 show the winding energized from a two-phase current source the coils respectively being connected to give 12 poles and 6 poles.

For controlling the connections of the coils and for energizing them I preferably in practice employ a controller of suitable construction, say of the revolving drum type, which when operated will switch the connections of the coils and current connections to secure the desired relations. For example in Fig. 4 I have shown diagrammatically a controller for securing the arrangements of Figs. 1, 2 and 3.

Referring to Fig. 4, I, II and III respectively represent the controller in its three positions, these positions corresponding to Figs. 1, 2 and 3. A, B and C in Fig. 4 indicate a three-phase current source and 1, 2, 3 and 4 a two-phase current source. The coils $A^1$—$A^8$, $B^1$—$B^8$, and $C^1$—$C^8$ are connected to terminals or slip rings (depending whether the winding is on the rotor or stator) which terminals or slip rings cooperate by means of suitable leads, as will be understood with the terminals 12 of the controller. The sources of current in a similar manner are connected to the terminals or slip rings 14 and cooperate with the terminals 16, 12 and 20 of the controller. It will thus be understood that when the controller is in position I the coils are connected and energized to secure the 8 pole three-phase motor of Fig. 1; when in the position II to give the 12 pole two-phase motor of Fig. 2; and in the position III to give the 6 pole two-phase motor of Fig. 3. It will be observed by these means that I utilize all the coils in each instance and am able to secure three different speeds of rotation in the ratio of 3:4:6.

In changing to a higher number of poles and therefore to a lower speed ratio, the consecutive coils in each phase of the three-phase winding are arranged alternately in the one and the other phase of the two-phase winding and therefore the coils $A^1$ $A^3$ $A^5$ $A^7$ of the phase A, Figure 1 of the three-phase winding are arranged in the phase shown in full lines in the two-phase arrangement, Figure 2, and the coils $A^2$ $A^4$ $A^6$ $A^8$ of the phase A of the three-phase winding, Figure 1, are arranged in the phase of the two-phase winding shown by broken lines in Figure 2. With the other two phases of the three-phase winding the same arrangement holds but in choosing the starting coil care must be taken that in the two-phase arrangement each coil overlaps two neighbouring coils in the same phase by one coil-side breadth.

In Figure 1 the coils of the second phase are lettered $B^1$ $B^2$ etc., and those of the third phase $C^1$ $C^2$ etc., and the same coils bear the same letters in Figure 2.

In Figure 2 corresponding to controller position II of Fig. 4 the instantaneous current directions in the coils of the phase shown in full lines and the poles produced by them are indicated by arrows. As is obvious from this figure a complete regular twelve pole two-phase winding is obtained which can be fed by means of a two-phase current as hereinbefore described.

If in the two-phase arrangement the coils are caused on one side to overlap by three coil side breadths instead of one such breadth and on the other side to be separated as before by a distance of one coil side breadth, the pole-changing system can be applied also to the ratio 8:6.

In Fig. 3 corresponding to controller position III of Fig. 4 of the accompanying drawing is illustrated by way of example an 8-pole three-phase winding, corresponding to Figure 1, which has been changed into a 6-pole two-phase winding, the coils arranged in one phase of the two-phase arrangement being shown in full lines while those in the other phase are shown with broken lines. As is to be seen from this figure two neighbouring coils for example coils $A^1$ and $B^2$ would overlap on one side by a distance equal to three coil-side breadths while on the other side the coil $A^8$ is separated from the coil $A^1$ or the coil $B^3$ from the coil $B^2$ by a distance of one coil side breadth.

The direction of the currents at a given moment in the coils of the phase shown in full line and the poles produced thereby are indicated by arrows. It is at once obvious that there are six poles.

With an 8-pole three-phase winding by using the arrangements of Figs. 2 and 3 three speed ratios are obtainable corresponding to the pole numbers 12, 8 and 6.

Although I have described for purposes of illustration one specific embodiment of my invention it is to be understood that I am not limited thereby to the particular details of the steps of the method and that within the scope of my invention wide deviations may be made therefrom without departing from the spirit of my invention.

Having now fully described and ascertained my said invention and the manner in which it is to be performed, I declare that what I claim is:

1. That method of regulating the speed of a polyphase induction motor having a primary winding in which each coil overlaps four coils, which consists in connecting said coils alternatively either into a three-phase winding in which the coils of the same phase follow each other a distance the breadth of one side of coil, or into a two phase winding in which the consecutive coils of the same phase overlap each other on the one side only and follow each other on the other side a distance the breadth of one side of coil.

2. That method of regulating the speed of a polyphase induction motor having a primary winding in which each coil overlaps four coils, which consists in connecting said coils alternatively either into a three-phase winding in which the coils of the same phase follow each other a distance the breadth of one side of coil, or into a two phase winding in which the consecutive coils of the same phase overlap each other with the breadth of one side of coil.

3. That method of regulating the speed of a polyphase induction motor having a primary winding in which each coil overlaps four coils, which consists in connecting said coils alternatively either into a three-phase winding in which the coils of the same phase follow each other a distance the breadth of one side of coil, or into a two-phase winding in which the consecutive coils of the same phase overlap each other on the one side with three-times the breadth of one side of coil and follow each other on the other side a distance of the breadth of one side of coil.

4. That method of regulating the speed of a polyphase induction motor having a primary winding in which each coil overlaps four coils, which consists in connecting said coils alternatively either into a three-phase winding in which the coils of the same phase follow each other in a distance the breadth of one side of coil, or into a two-phase winding in which the consecutive coils of the same phase overlap each other the breadth of one side of coil on both sides, or into a two-phase winding in which the consecutive coils of the same phase overlap each other on the one side three-times the breadth of one side of coil and follow each other on the other side in a distance of the breadth of one side of coil.

5. That method of regulating the speed of a polyphase induction motor having a primary winding in which each coil overlaps four coils, which consists in connecting said coils alternatively either into a two-phase winding in which the consecutive coils of the same phase overlap each other the breadth of one side of coil on both sides, or into a two-phase winding in which the consecutive coils of the same phase overlap each other on the one side with three-times the breadth of one side of coil and follow each other on the other side a distance the breadth of one side of coil.

6. That method of regulating the speed of a polyphase induction motor having a primary winding in which each coil overlaps four coils, which consists in connecting said coils alternatively either into a three-phase winding in which the coils of the same phase follow each other a distance the breadth of one side of coil, or into a two-phase winding in which the consecutive coils of the same phase overlap each other.

7. That method of changing the speed of a polyphase induction motor having a plurality of overlapping coils, which consists in connecting said coils into either a three-phase winding in which a coil is provided in each phase for each pole and each coil overlapping two coils in each of two other phases, or into a two-phase winding in which each coil overlaps two neighboring coils in the same phase by the breadth of a coil side and in which two-phase winding the consecutive coils used in the three-phase winding are arranged alternatively in one or the other phase of the two-phase winding.

In testimony whereof I affix my signature in presence of two witnesses.

Dr. OTTO TITUSZ BLÁTHY.

Witnesses:
    EMIL LÓVÁRY,
    BENO ALTMAN.